Figure 1:
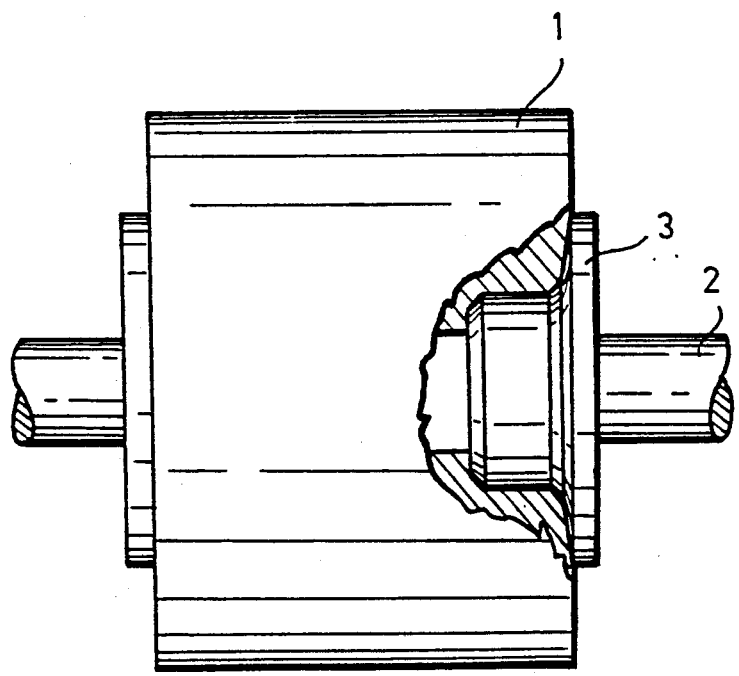

United States Patent [19]

Pessa

[11] Patent Number: 5,111,999
[45] Date of Patent: May 12, 1992

[54] ARRANGEMENT FOR FASTENING THE GRINDSTONE OF A PULP GRINDER TO A ROTARY SHAFT

[75] Inventor: Raimo Pessa, Tampere, Finland

[73] Assignee: Oy Tampella AB, Tampere, Finland

[21] Appl. No.: 626,201

[22] Filed: Dec. 7, 1990

[30] Foreign Application Priority Data

Dec. 20, 1989 [FI] Finland .................................. 896125

[51] Int. Cl.$^5$ .............................................. B02C 19/00
[52] U.S. Cl. ........................................ 241/293; 51/168
[58] Field of Search ............... 51/168, 206 R; 29/123, 29/129.5; 241/293, 295; 403/367, 368, 369

[56] References Cited

U.S. PATENT DOCUMENTS 3,721,391  3/1973  Lepola ................................ 241/293

FOREIGN PATENT DOCUMENTS 39048     3/1924  Norway .
355274   11/1972  U.S.S.R. .............................. 241/293

OTHER PUBLICATIONS

Care In Operation Key To Maintenance Of Modern Pulpstones, 2-60.

Primary Examiner—Mark Rosenbaum
Attorney, Agent, or Firm—Ladas & Parry

[57] ABSTRACT

An arrangement for fastening a grindstone (1) of a pulp grinder to a rotatory shaft (2). In the arrangement, the radial forces acting on the grindstone are transmitted from the fastening flange (3) of the grindstone (1) to the rotatory shaft (2) by means of a support member (12) which transmits the radial forces from the fastening flange (3) through the support member (12) to the rotatory shaft (2) in such way that they do not substantially affect the threads (8), (9) of the nut (7) and the rotatory shaft (2).

6 Claims, 2 Drawing Sheets

ARRANGEMENT FOR FASTENING THE GRINDSTONE OF A PULP GRINDER TO A ROTARY SHAFT

The invention relates to an arrangement for fastening a grindstone of a pulp grinder to a rotatory shaft, comprising, at both ends of the grindstone, a fastening flange provided with a sleeve-like projection extending into a recess provided in the grindstone and supporting the stone radially, whereby the rotatory shaft, which extends through holes provided in the grindstone and in the fastening flanges, comprises threads on both sides of the grindstone, and fastening nuts comprising similar threads are screwed on said threads, thus forcing the fastening flanges towards the grindstone to fix the grindstone unrotatably with respect to the rotatory shaft.

A grindstone in a pulp grinder is usually fastened to its rotatory shaft at the ends by means of a nut which is screwed on threads provided on the shaft. The nut may be substantially cylindrical or conical, and the grindstone is fixed unrotatably with respect to the shaft by a force acting on the threads of the nut and the shaft. A fastening flange provided between the nut and the grindstone distributes the press force created by the nut over a wider area at the end of the grindstone. This kind of solution is disclosed in SE Patent 80084, for instance.

In the prior art, the entire force caused by the radial and axial loads acting on the stone is transmitted to the shaft through the nut via the threads of the threaded joint between the nut and the shaft. However, the distribution of strain in the threads is not even, but the greatest strain is exerted on the second thread of the shaft due to the common flux of the forces. The situation is further aggravated by the fact that the forces acting on the grindstone tend to bend the shaft and therefore the threads of the shaft and the nut tend to be displaced with respect to each other both axially and radially. With high powers and high shaft loads in particular, the thread is easily exposed to corrosion fatigue, which damages the thread.

The object of the present invention is to provide an arrangement for fastening a grindstone to a shaft in such a way that the above-mentioned disadvantages are avoided and the strain exerted on the thread and the shaft is distributed more evenly. This is achieved according to the invention in such a way that a support member is provided at both ends of the grindstone, one side of the support member bearing on the rotatory shaft and the other side supporting the fastening flange radially in such a way that the radial forces acting on the grindstone are transmitted substantially through the support member instead of the threads to the rotatory shaft.

The basic idea of the invention is that the fastening in the axial direction and the support in the radial direction are effected by two separate parts, whereby the load and support in the axial direction are effected by means of a nut and the radial support of the stone is effected by supporting means, such as a support sleeve, which does not substantially receive any axial loads. In this way, the forces acting on the threads of the nut and the shaft are almost exclusively axial, so that the load peaks caused by the bending and the radial load of the shaft do not affect the threads, and the fatigue of the threads is avoided. Correspondingly, the support sleeve receives the radial forces and transmits them directly to the shaft, so that the support sleeve is not strained by any axial forces.

Figure 2:
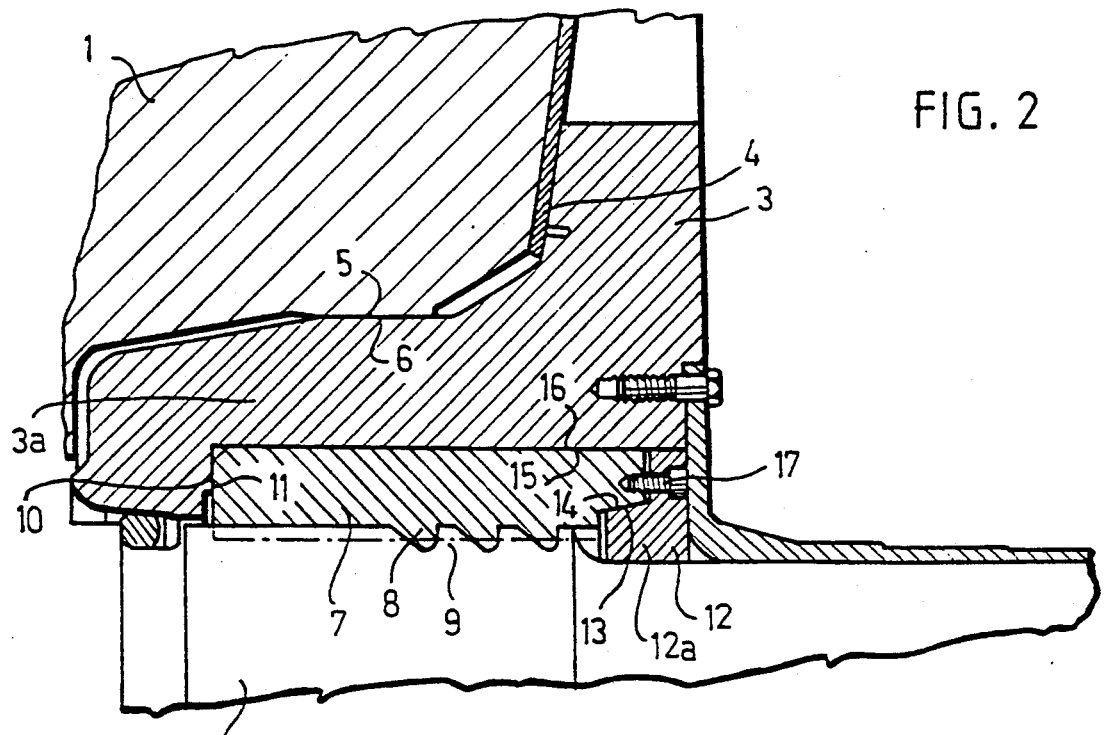
Figure 3:
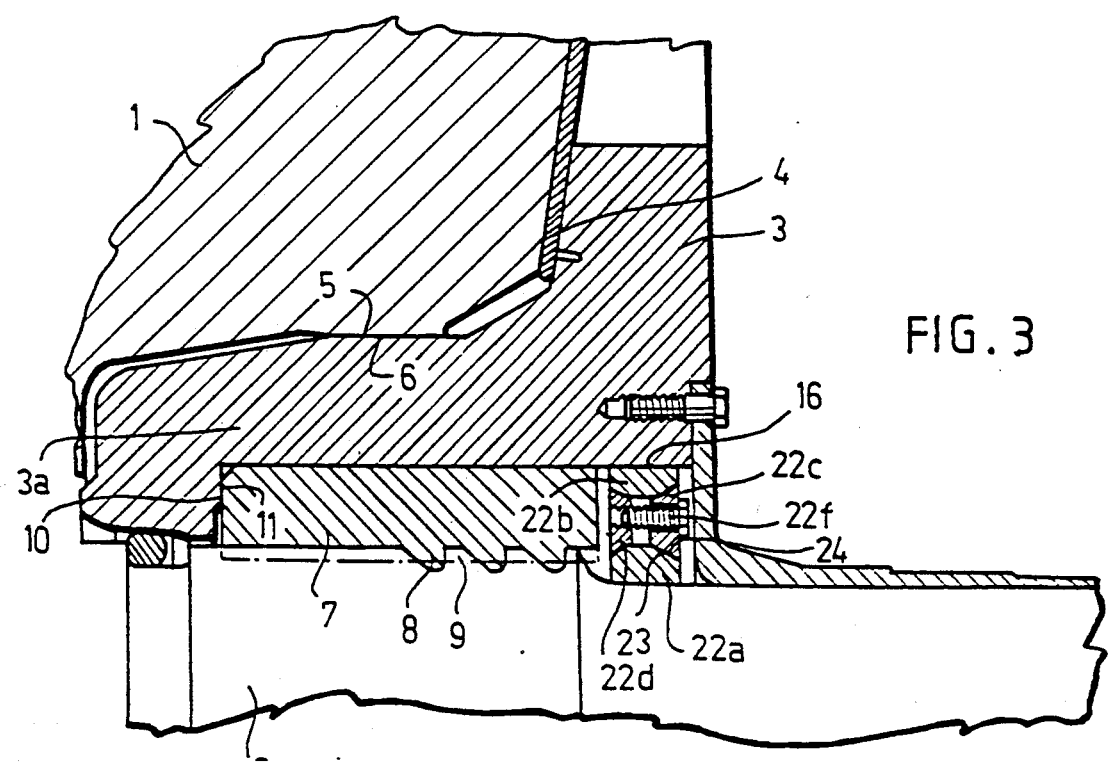

The invention will be described in greater detail in the attached drawings, where FIG. 1 illustrates schematically a grindstone of the invention in a pulp grinder in a partial cross-section;

FIG. 2 is a more detailed view of one embodiment of the arrangement of the invention; and FIG. 3 is a more detailed view of another embodiment of the invention.

FIG. 1 shows a grindstone 1 and a rotatory shaft 2 extending through the grindstone 1 in a partial section. A fastening flange 3 is provided at both ends of the grindstone 1. The flange is positioned against the end of the grindstone 1 and provided with a sleeve-like support extending into a recess provided in the grindstone. The rotatory shaft 2 thus extends through holes provided in the grindstone and the fastening flanges 3.

FIG. 2 is a more detailed view of one embodiment of the grindstone shown in FIG. 1. In FIG. 2, a grouting 4 distributing the load more evenly is provided between the fastening flange 3 and the end of the grindstone 1. The use of such a grouting is known per se and obvious to one skilled in the art and will not be described in more detail here. The fastening flange further comprises a sleeve-like projection 3a. When fastening the stone, the outer surface 5 of the sleeve-like protection guides the fastening flange in accordance with an outer surface 6 of the shaft hole of the stone. However, a predetermined clearance is left between the sleeve-like projection 3a and the shaft hole of the grindstone, so that the radial forces acting on the grindstone 1 are transmitted through the grouting surface 4 from the grindstone 1 to the fastening flange 3. A fastening nut 7 is provided between the fastening flange 3 and the rotatory shaft 2. Threads 8 provided on the fastening nut 7 tighten the nut with respect to the rotatory shaft 2 in its axial direction by means of threads 9 provided on the rotatory shaft 2. The nut 7 supports the fastening flange 3 in the axial direction with its surface 11 bearing on a surface 10 of the fastening flange. A support member 12 is further provided at the end of the nut 7 around the rotatory shaft 2. On the side of the nut 7 the support member 12 comprises a sleeve-like part 12a extending between the nut and the rotatory shaft. A conical surface 13 in the part 12a of the support member or sleeve 12 makes contact with a corresponding conical surface 14 in the nut 7 on the side of the support member 12, and an outer surface 15 in the nut on the side of the fastening flange makes contact with an inner surface 16 in the fastening flange. When the support member is tightened by means of bolts 17 extending through it towards the nut, the surface 13 of the conical part 12a is pressed against the corresponding surface 14 of the nut, thus forcing it towards the fastening flange, whereby the radial forces acting on the fastening flange are transmitted through the nut 7 and through the support member 12 to the rotatory shaft 2 so that they do not substantially strain the threads 8 and 9 in the radial direction. Thereby only support forces parallel to the rotatory shaft 2 act on the threads 8 and 9, and the strain peaks caused by the prior art solutions can be avoided.

FIG. 3 shows another embodiment of the arrangement of the invention, in which the structure deviates from that shown in FIG. 2 only in that a support member 22 transmits the radial forces acting on the fastening flange 3 directly to the rotatory shaft so that they are not at all transmitted through the nut 7. In FIG. 3, the support member 22 is formed by two annular parts 22a and 22b having conical surfaces 23 at the edges. Annular tightening parts 22c and 22d having similar conical surfaces 24 are disposed between the annular parts 22a and 22b in such a way that the conical surfaces 23 and 24 fit together in the radial direction. On tightening the tightening parts 22c and 22d by means of bolts 22f, the parts are brought towards each other, thus forcing the annular parts 22a and 22d apart from each other, that is, against the outer surface of the rotatory shaft 2 and the surface 16 of the fastening flange 3. In this embodiment, the nut 7 is apart from the support member 22 so that no other substantial forces than the support forces parallel to the rotatory shaft 2 are exerted on it.

In the above description and drawings the invention has been described by way of example and it is in no way restricted to the embodiments disclosed. The figures and the description show the structure of one end of the grindstone; however, it is to be understood that the structure of the other end is identical.

I claim:

1. An arrangement for fastening a grindstone of a pulp grinder to a rotatory shaft, comprising fastening flanges positioned at both ends of the grindstone, each fastening flange having a sleeve-like projection extending into a recess provided in the grindstone to support the grindstone radially, each said fastening flange having a recess defined therein so that the rotatory shaft may extend through said recess provided in the grindstone and said recess provided in the fastening flanges, fastening nuts having internal threads that are engageable with corresponding external threads on said rotatory shaft so that said fastening nuts can be screwed unto said rotatory shaft to engage each fastening flange and force each fastening flange towards the grindstone to fix the grindstone unrotatably with respect to the rotatory shaft, and a support member being provided at both ends of the grindstone around the rotatory shaft, one side of the support member bearing against the rotatory shaft and the other side of the support member bearing against the fastening flange so that the radial forces acting on the grindstone are substantially transmitted through the support member instead of through the threads of the fastening nut to the rotatory shaft.

2. An arrangement according to claim 1, wherein the support member comprises at least one substantially conical surface which is arranged to be pressed in an axial direction of the grindstone against another similar conical surface to press the support member against the rotatory shaft and the fastening flanges.

3. An arrangement according to claim 1, wherein the support member is mounted immediately between the fastening flange and the rotatory shaft.

4. An arrangement according to claim 3, wherein the support member comprises two support rings, the first support ring being in contact with the rotatory shaft and the second support ring being in contact with a support surface in the fastening flange; and two tightening rings positioned between the support rings, whereby the support rings and the tightening rings comprise conical support surfaces arranged to be pressed against each other, and whereby the support member is arranged to be tightened between the rotatory shaft and the support surface of the fastening flange by pressing the tightening rings against each other.

5. An arrangement according to claim 1, wherein the support member is mounted between the rotatory shaft and an outer end of the fastening nut wherein an inner end of the fastening nut is in contact with an inner portion of the sleeve-like projection of the fastening flange so that the radial forces acting on the grindstone are transmitted to the rotatory shaft from the fastening flange through the outer end of the fastening nut instead of transmitting the radial forces through the threads of the rotatory shaft.

6. An arrangement according to claim 5, wherein the support member is a support sleeve having a conical outer surface, the conical outer surface of the support sleeve bearing against a similar conical support surface in the outer end of the fastening nut.

* * * * *